US008833423B2

(12) United States Patent
Chida et al.

(10) Patent No.: US 8,833,423 B2
(45) Date of Patent: Sep. 16, 2014

(54) FILM ATTACHMENT APPARATUS AND ATTACHMENT METHOD

(75) Inventors: Masao Chida, Tokyo (JP); Syouji Mori, Tokyo (JP)

(73) Assignee: NEC Engineering, Ltd., Tokyo (JP)

( * ) Notice: Subject to any disclaimer, the term of this patent is extended or adjusted under 35 U.S.C. 154(b) by 0 days.

(21) Appl. No.: 13/806,114

(22) PCT Filed: Apr. 14, 2011

(86) PCT No.: PCT/JP2011/002217
§ 371 (c)(1),
(2), (4) Date: Dec. 20, 2012

(87) PCT Pub. No.: WO2011/161861
PCT Pub. Date: Dec. 29, 2011

(65) Prior Publication Data
US 2013/0098544 A1    Apr. 25, 2013

(30) Foreign Application Priority Data
Jun. 24, 2010 (JP) ................. 2010-143415

(51) Int. Cl.
*B29C 63/04* (2006.01)
*B32B 38/10* (2006.01)
*B32B 39/00* (2006.01)
*B29C 65/78* (2006.01)
*B32B 37/00* (2006.01)
*B29C 63/02* (2006.01)
*B32B 38/18* (2006.01)
*B29L 31/34* (2006.01)

(52) U.S. Cl.
CPC ............. *B29C 65/7805* (2013.01); *B32B 38/10* (2013.01); *B32B 2457/20* (2013.01); *B32B 38/1858* (2013.01); *B29L 2031/3475* (2013.01); *B32B 38/1866* (2013.01); *B32B 39/00* (2013.01); *B32B 37/003* (2013.01); *B29C 63/02* (2013.01)
USPC ............................ 156/759; 156/764; 156/767

(58) Field of Classification Search
CPC .............. B32B 38/185; B32B 38/0004; B29C 65/7805; B29C 65/18; B29C 65/02; G02B 6/4232; G11B 7/1205; B65C 5/00; B65C 5/02; B65C 11/00; B65C 9/1865; B65H 37/002; B65H 35/0026; A61F 2013/0296; A61J 3/00
USPC ......... 156/584, 344, 248, 540, 247, 767, 766, 156/764, 765, 351, 345.24, 350, 378, 379, 156/538; 271/281
See application file for complete search history.

(56) References Cited

U.S. PATENT DOCUMENTS
2005/0199337 A1    9/2005  Nishikubo et al.

FOREIGN PATENT DOCUMENTS

| CN | 1669789 (A) | | 9/2005 | |
|----|---|---|---|---|
| JP | 9-309664 A | | 12/1997 | |
| JP | 3004532 B2 | | 1/2000 | |
| JP | 2001-42315 (A) | | 2/2001 | |
| JP | 2005-017444 A | | 1/2005 | |
| JP | 2006-199325 (A) | | 8/2006 | |
| JP | 2010-066283 | * | 3/2010 | ............... G09F 9/00 |
| JP | 2010-066283 A | | 3/2010 | |
| TW | 200621460 A1 | | 7/2006 | |
| TW | I298992 | | 7/2008 | |

OTHER PUBLICATIONS

Fukuda Keiichi, Method and device for striping off protective sheet, Jan. 2005, Japan patent office.*
Dairoku Noriyuki, Optical film sticking device, optical film sticking method, and manufacturing method of display panel Mar. 2010, Japan Patent office.*
Taiwanese Office Action dated Mar. 19, 2014, with English translation.
Chinese Office Action dated May 5, 2014, with English translation.

* cited by examiner

*Primary Examiner* — Joseph S Del Sole
*Assistant Examiner* — Vishal I Patel
(74) *Attorney, Agent, or Firm* — McGinn IP Law Group, PLLC

(57) ABSTRACT

A film application apparatus removes a glue surface protective sheet from a separated film and applies the film to the panel. The film application apparatus includes a press stage that presses the film from above the film, a press unit that presses an end part of the glue surface protective sheet from below so as to bend and raise the end part of the glue surface protective sheet and remove the end part of the glue surface protective sheet from the film, thereby performing primary removal to the glue surface protective sheet, an application head that is configured to be rotatable around a spindle, and has a curved surface convex toward the glue surface protective sheet and holds the film with the glue surface protective sheet being primarily removed, and a removal tape that removes the entire glue surface protective sheet from the film held by the application head.

12 Claims, 23 Drawing Sheets

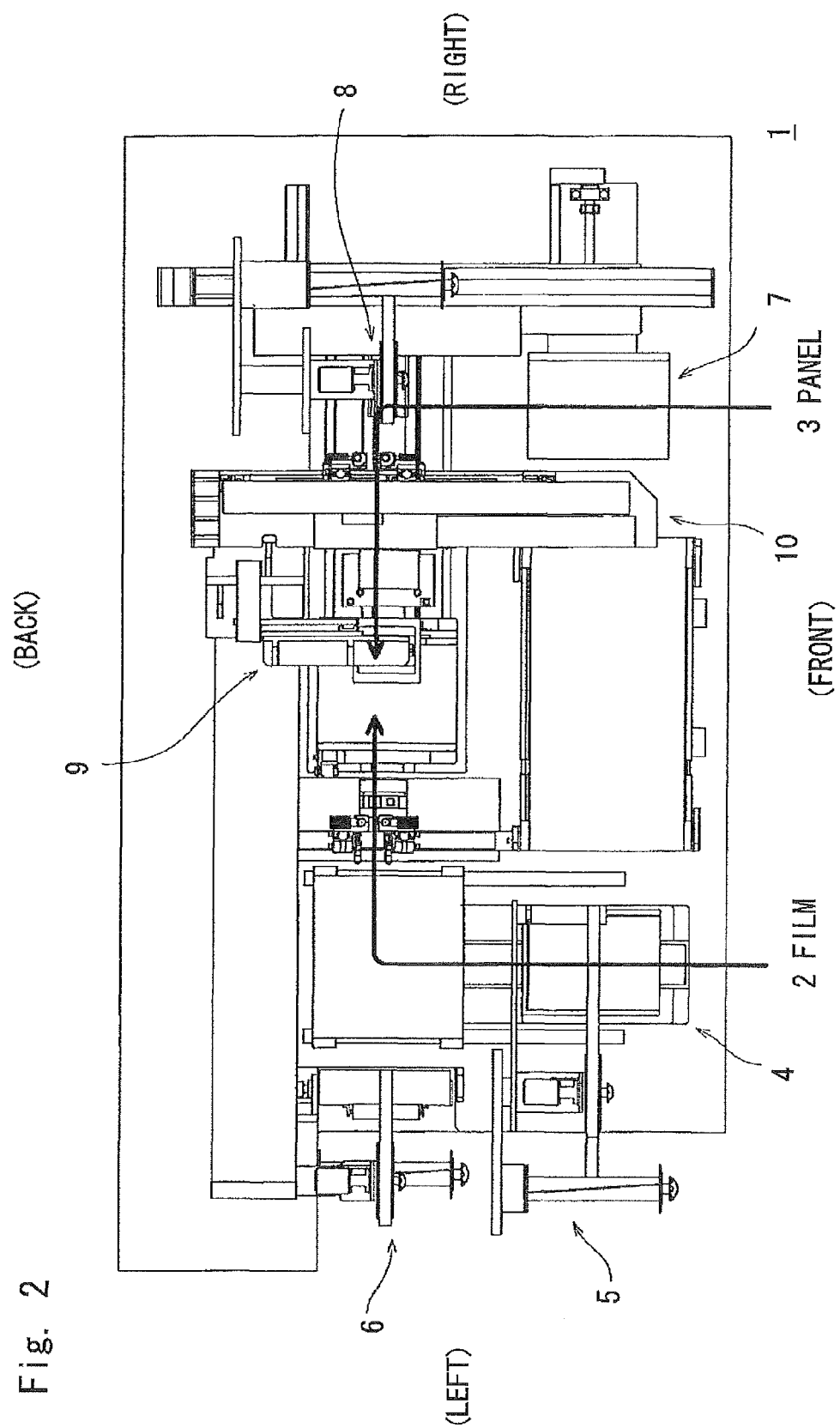

VACUUM ABSORPTION

FILM ATTACHMENT APPARATUS AND ATTACHMENT METHOD

TECHNICAL FIELD

The present invention relates to a film application apparatus and an application method, and particularly to an apparatus and the like that applies a separation type film on an object to be applied.

BACKGROUND ART

In a liquid crystal display or a plasma display, a thin film such as a polarizing plate film, a protective film and the like is applied to the surface of the display panel, thus an application apparatus dedicated for applying the film is used in manufacturing of liquid crystal displays, for example.

As this kind of film application apparatus, Patent Literature 1 for example suggests an apparatus using an arcuate application head in order to prevent entrapment of air bubbles and deformation inside the film. As shown in FIGS. 26A to 26D, this film application apparatus includes a curved surface in which a surface facing the film (holding surface) is convex, an application head 101 that is configured to be rotatable around a spindle 102, and a panel support 104 on which the panel 103 is placed that is configured to be movable in the horizontal direction.

In this application apparatus, at the time of applying a film 105, firstly air is aspirated from the holding surface of the application head 101 and the film 105 is absorbed so that an adhering surface is positioned outside, as shown in FIG. 26A. After that, as shown in FIGS. 26B to 26D, the application head 101 is rotated along the movement of the panel support 104 (movement of the panel 103), and the film 105 is applied in order from right end of the panel 103.

CITATION LIST

Patent Literature

Patent Literature 1: Japanese Patent No. 3004532

SUMMARY OF INVENTION

Technical Problem

By the way, a glue surface protective sheet is temporarily bonded to an adhering surface of a film in an attempt to prevent an adhesive from being removed or scratches on the adhering surface. Therefore, it is necessary to remove the glue surface protective sheet from the adhering surface of the film prior to application to the panel at the time of applying the film.

At this time, for example, as shown in FIG. 27, when a plurality of films 112 are temporarily bonded to a surface of a long strip-shaped glue surface protective sheet 11, the glue surface protective sheet can be fixed to prevent up and down movement by winding the glue surface protective sheet 111 around a feed roller 113 and a take-up roller 114. It is therefore possible to separate the film 112 and the glue surface protective sheet 111 by lifting the film 112 in that state by absorbing the film 112, for example.

However, the type and strength of the film may not be suitable for temporary adhering to the long strip-shaped glue surface protective sheet and take-up around the roller. Such a film is separated into the size of one sheet to be supplied. In such a separation type film, as shown in FIG. 28A, a glue surface protective sheet 122 with the same size as a film 121 is temporarily bonded to the adhering surface of the film 121, thus there is a problem that the glue surface protective sheet 122 is hard to be removed, thereby reducing the workability of the application compared to the long type one in FIG. 27.

Moreover, usually the separation type film is cut by a cutter for die and the like, however when a cutting edge wears depending on the usage state of the cutter and the like, a cut part of the glue surface protective sheet 122 is collapsed by the cutter and the like. As a result, phenomena occur such that an end part of the glue surface protective sheet 122 is plastically deformed and rounded, and an adhesive 123 runs off from the edge and extends around the side surface, and thereby adding further difficulty to remove the glue surface protective sheet 122, which is a peculiar circumstance to the separation type.

Thus, the present invention is made in view of the problem in the abovementioned related art, and its object is to provide a film application apparatus and the like that is capable of readily removing a glue surface protective sheet from a separation type film and improve workability of the application.

Solution to Problem

In order to realize the above object, the present invention is characterized in including a film press unit that presses a separated film from an opposite surface side to a surface with a glue surface protective sheet of the film temporarily bonded thereto in a state where the glue surface protective sheet is temporarily bonded to an adhering surface, a press unit that presses an end part of the glue surface protective sheet from the surface with the glue surface protective sheet of the film being temporarily bonded thereto so as to bend and raise the end part of the glue surface protective sheet and remove the end part of the glue surface protective sheet from the film and therefore primary removal of the glue surface protective sheet is performed, an application head that holds the film with the glue surface protective sheet being primarily removed, and a removal unit that removes the entire glue surface protective sheet from the film held by the application head, in which the film application apparatus removes the glue surface protective sheet from the film and applies the film to an object to be applied.

According to the present invention, the press unit bends and raises the end part of the glue surface protective sheet, and the primary removal is performed prior to the entire removal of the glue surface protective sheet, thus at the time of entire removal, the glue surface protective sheet can be removed starting from the part removed in the primary removal. Therefore, the glue surface protective sheet can be readily removed even in the case of the separation type film, and workability of the application can therefore be improved.

In the above film application apparatus, the press unit can move in a direction parallel to the glue surface protective sheet in a state where the end part of the glue surface protective sheet is pressed in a direction vertical to the glue surface protective sheet. Then, the end part of the glue surface protective sheet can be readily bent and raised.

In the above film application apparatus, the end part of the glue surface protective sheet on the bent and raised side is pressed toward an opposite end part to the end part, and secondary removal is performed to the glue surface protective sheet. Then, removal tendency can be given to the glue surface protective sheet, thereby further facilitating removal of the glue surface protective sheet.

In the above film application apparatus, the removal unit includes a removal tape including an adhering surface on a surface facing the glue surface protective sheet, a tape support unit that supports the removal tape, and a movement mechanism that moves the removal tape. While stopping the movement of the removal tape, the film application apparatus presses the end part of the glue surface protective side on the bent and raised side or one side of the removal tape supported by the tape support unit against the end part of the glue surface protective sheet or the other side of the supported removal tape, and in that state, is able to move the application head so that the end part of the glue surface protective sheet on the bent and raised side is pressed toward the opposite end part to the end part.

In the above film application apparatus, the removal unit includes a removal tape including an adhering surface on a surface facing the glue surface protective sheet, a tape support unit that supports the removal tape, and a movement mechanism that moves the removal tape. While stopping movement of the application head, the film application apparatus presses the end part of the glue surface protective side on the bent and raised side or one side of the removal tape supported by the tape support unit against the end part of the glue surface protective sheet or the other side of the supported removal tape, and in that state, is able to move the removal tape so that the end part of the glue surface protective sheet on the bent and raised side is pressed toward the opposite end part to the end part.

In the above film application apparatus, the application head is configured to be rotatable around a spindle and also has a curved surface that is convex toward the glue surface protective sheet and holds the film with the glue surface protective sheet being primarily removed on the curved surface.

In the above film application apparatus, adhesive rubber that adheres to and holds the glue surface protective sheet can be placed on the curved surface of the application head.

The above film application apparatus can further include a detection apparatus that detects a distance from a predetermined reference position to a surface of the adhesive rubber, and a height adjustment apparatus that adjusts height of the application head so that the distance detected by the detection apparatus will be a constant value.

Further, the present invention is characterized that in a state where a glue surface protective sheet is temporarily bonded to an adhering surface, while pressing a separated film from an opposite surface side to the surface with the glue surface protective sheet of the film temporarily bonded thereto, pressing an end part of the glue surface protective sheet from the surface with the glue surface protective sheet of the film being temporarily bonded thereto so as to bend and raise the end part of the glue surface protective sheet and remove the end part of the glue surface protective sheet from the film and therefore performing primary removal of the glue surface protective sheet, holding the film with the glue surface protective sheet being primarily removed by an application head, removing the entire glue surface protective sheet from the film held by the application head, and applying the film with the glue surface protective sheet being removed to an object to be applied.

Advantageous Effects of Invention

As mentioned above, according to the present invention, it is possible to readily remove the glue surface protective sheet from the separation type film and thereby improve the workability of the application.

BRIEF DESCRIPTION OF DRAWINGS

FIG. 2 is a top view showing a flow of the film and the panel.

DESCRIPTION OF EMBODIMENTS

Next, an exemplary embodiment for incorporating the present invention is explained in detail with reference to the drawings. An example is explained here in which a film application apparatus according to the present invention is incorporated to apply a film to a liquid crystal display panel (hereinafter referred to as a "panel").

Figure 1A:
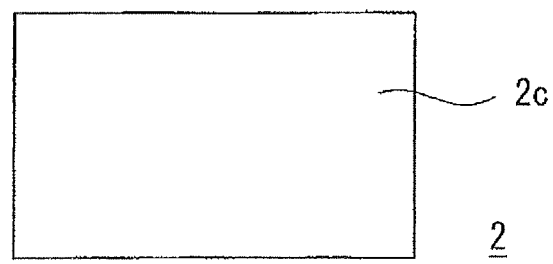
FIG. 1A is a top view of a film.
Figure 1B:
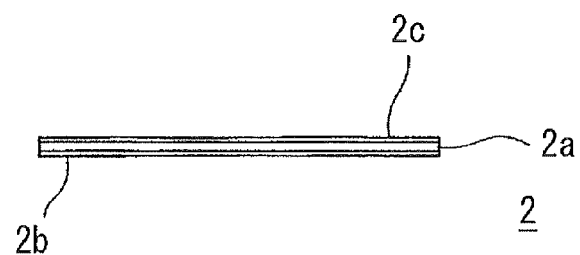
FIG. 1B is a front elevational view of the film.
Figure 1C:
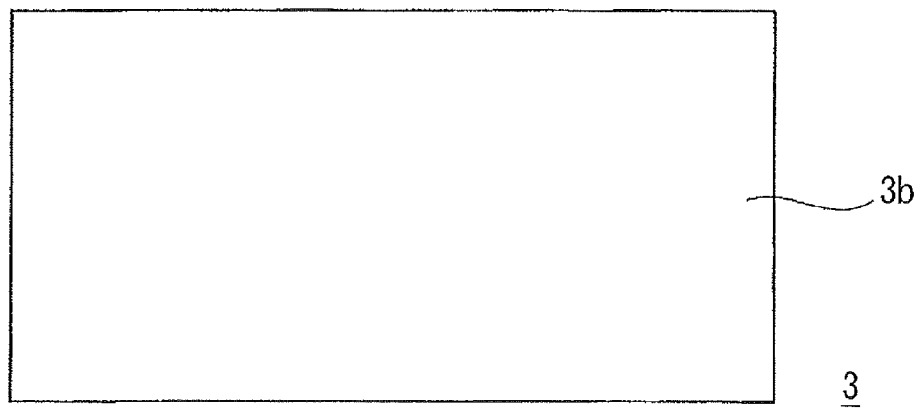
FIG. 1C is a top view of a panel.
Figure 1D:
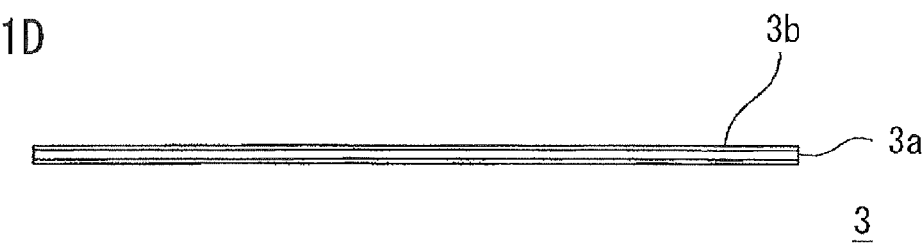
FIG. 1D is a front elevational view of the panel.

Moreover, in this exemplary embodiment, as shown in FIG. 1B, a film 2 adopts the one with a glue surface protective sheet 2b being temporarily bonded to a back surface (adhering surface) of a film body 2a and a surface protective sheet 2c being temporarily bonded to a surface of the film body 2a. As shown in FIG. 1D, the panel 3 adopts the one with a surface protective sheet 3b being temporarily bonded to a surface of a panel body 3a. Note that FIG. 1A is a top view of the film 2, and FIG. 1C is a top view of the panel 3.

FIGS. 2 to 8 show the exemplary embodiment of the film application apparatus according to the present invention. As shown in FIG. 2, this film application apparatus 1 receives the panel 3 from front right hand side while receiving the film 2 from front left hand side, and is configured to transport each of the film 2 and the panel 3 to the center of a film transport apparatus 1 and bond them. Note that in this specification, for the convenience of the explanation, front and back is determined based on the film application apparatus 1 (front of the film application apparatus 1 shall be front), and left and right is determined based on the sheet of FIG. 2.

As shown in the drawing, the film application apparatus 1 is mainly composed of a film supply unit 4, a first surface sheet removal unit 5, a glue surface sheet removal unit 6, a panel supply unit 7, a second surface sheet removal unit 8, an application unit 9, and a transport unit 10.

The film supply unit 4 is provided to transport the film 2 loaded by an operator, and supplies the film 2 to the first surface sheet removal unit 5, the glue surface sheet removal unit 6, and the application unit 9.

Figure 3:
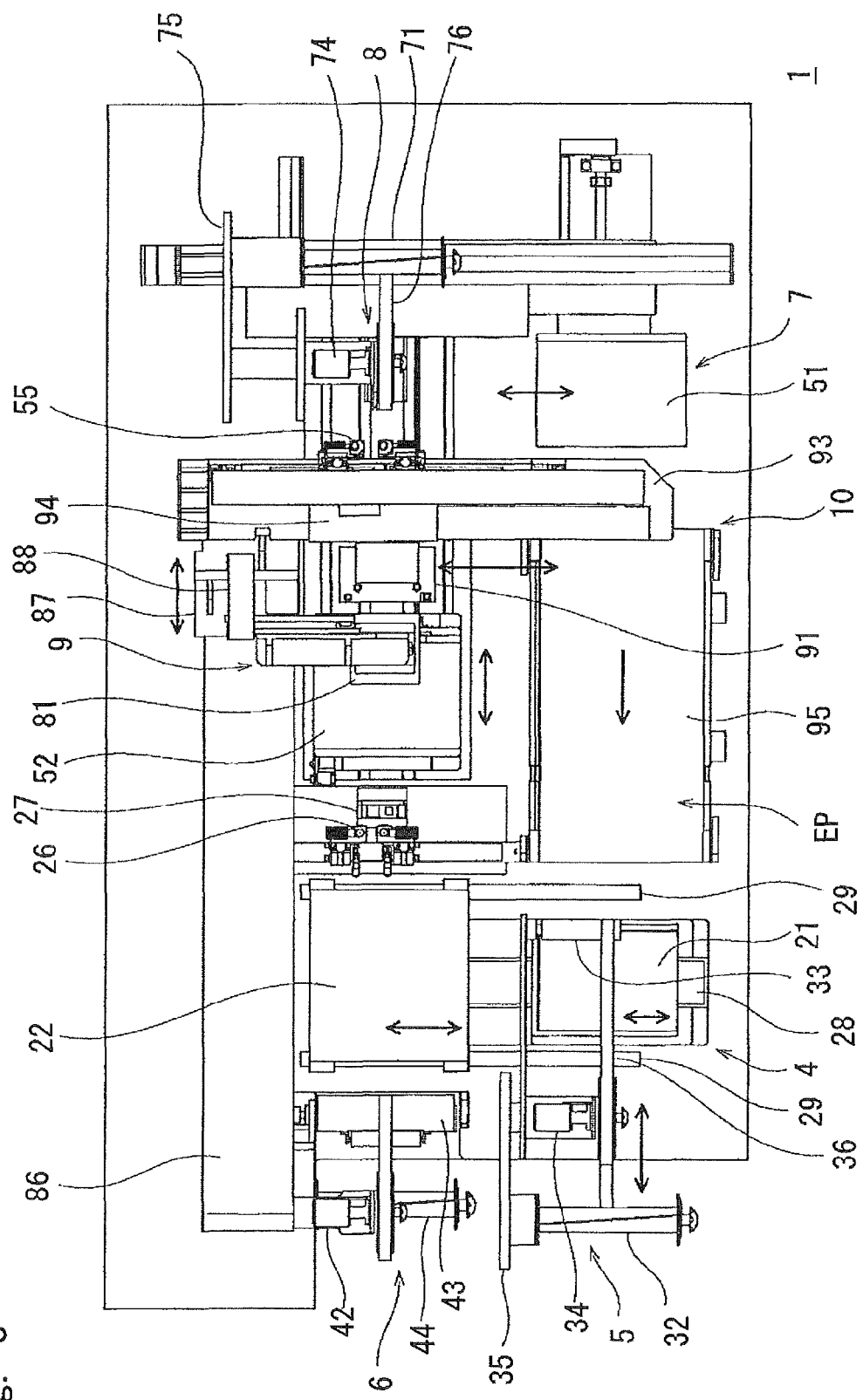
FIG. 3 is a top view showing an exemplary embodiment of a film application apparatus according to the present invention.
Figure 5:
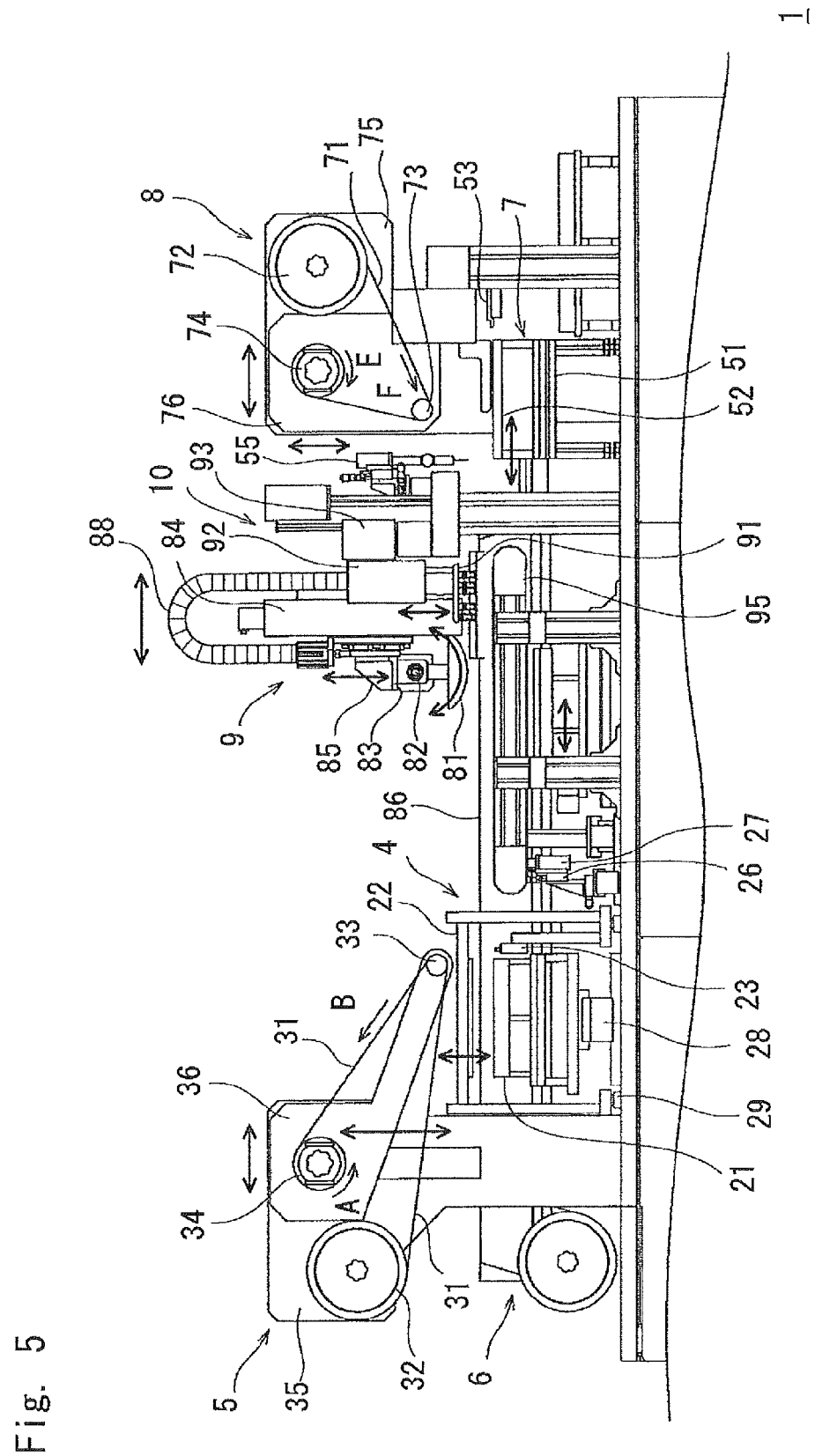
FIG. 5 is a front elevational view showing an exemplary embodiment of the film application apparatus according to the present invention.

As shown in FIGS. 3 and 5, the film supply unit 4 is composed of, for example, a film absorption stage 21 for vacuum absorption of the film 2 on a top surface, a press stage 22 that is deposed above the film absorption stage (see FIG. 5) and configured to be ascendable and descendible, a primary removal apparatus 23 that is disposed below the press stage 22 and performs primary removal of the glue surface protective sheet 2b (see FIG. 1B) which is temporarily bonded to the back surface of the film 2, a camera 26 for detecting a position of the film 2 on an application head 81 described later, and a height sensor 27 for detecting the height of the application head 81. Note that the primary removal is described in detail later.

Figure 4:
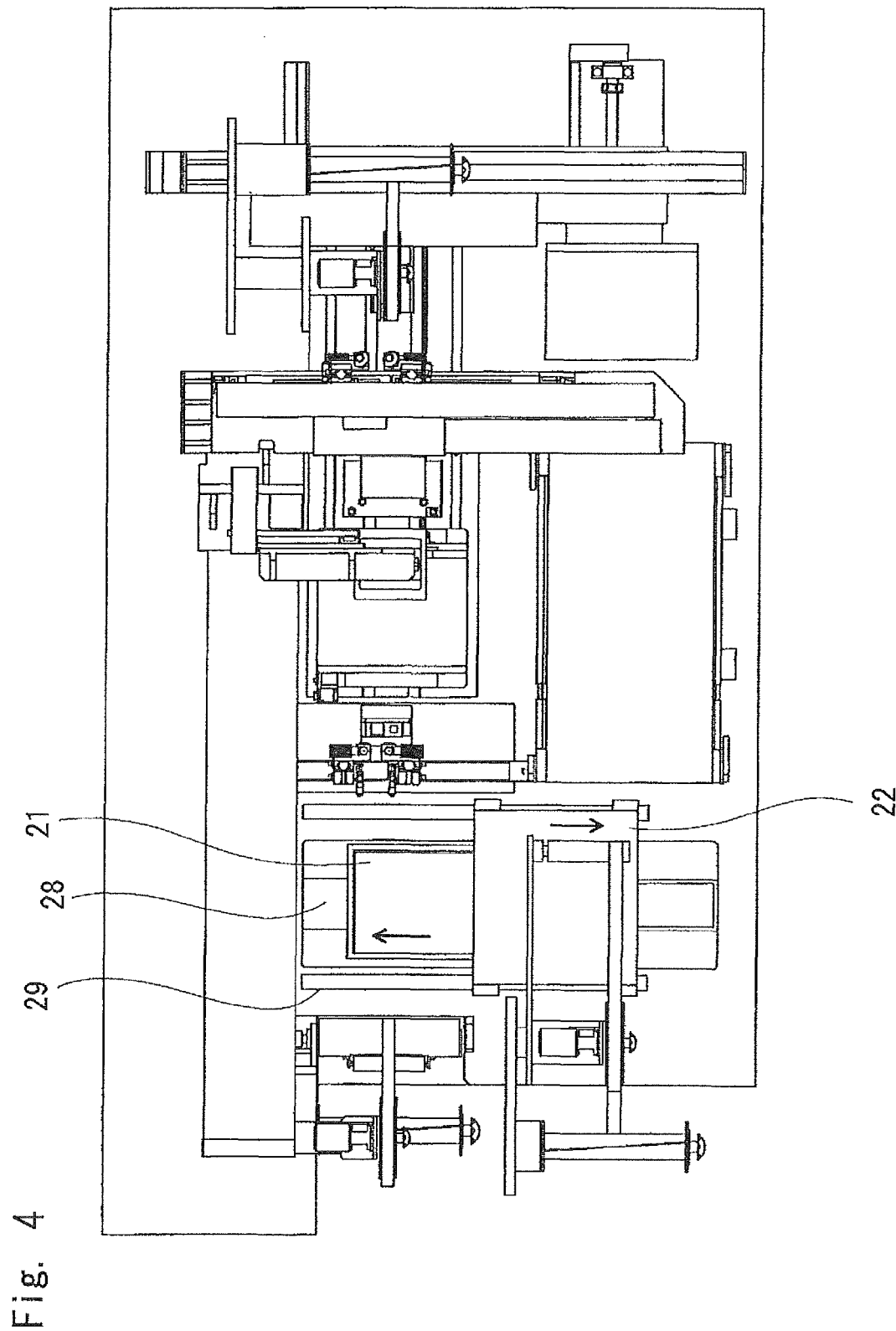
FIG. 4 is a top view showing a state in which a film absorption stage and a press stage of FIG. 3 are moved.

As shown in FIG. 4, the film absorption stage 21 is configured to be movable in the longitudinal direction (depth direction) of the film application apparatus 1 along a guide rail 28. Further, the press stage 22 and the primary removal apparatus 23 are also configured to be movable in the longitudinal direction of the film application apparatus 1 along a guide rail 29.

Figure 7A:
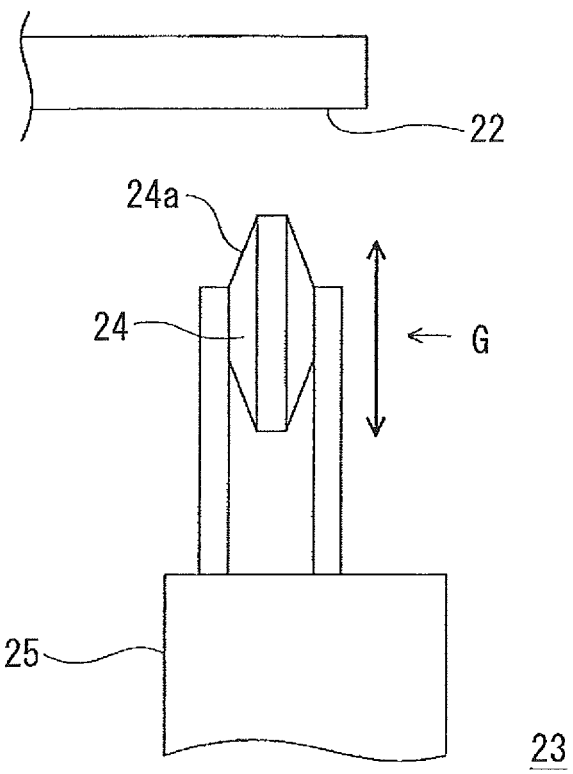
FIG. 7A is a front elevational view of a primary removal apparatus.
Figure 7B:
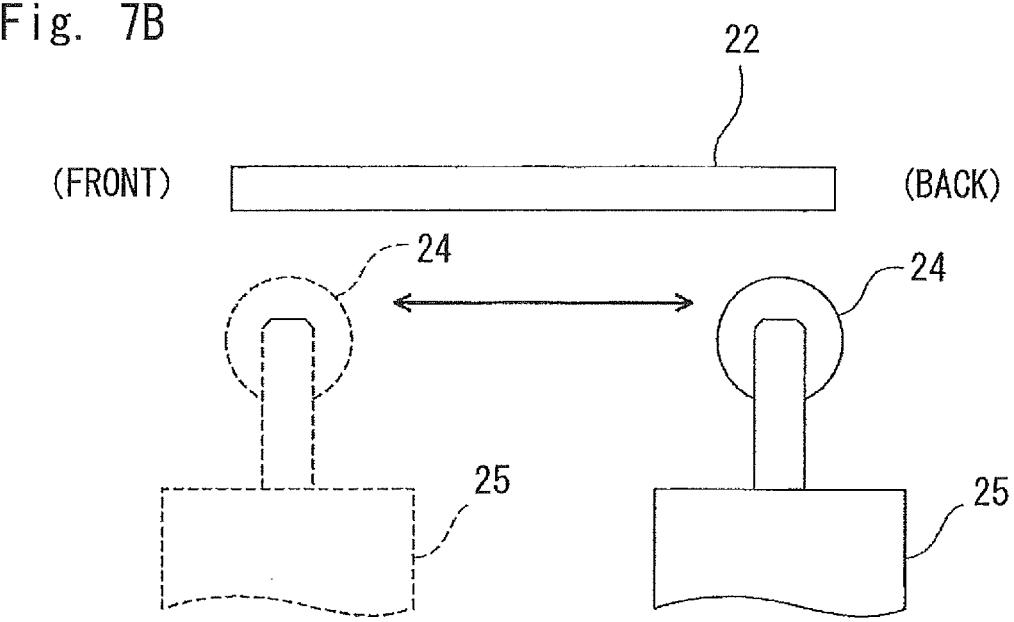
FIG. 7B is a view in the direction of an arrow G of FIG. 7A.

As shown in FIG. 7A, the primary removal apparatus 23 includes a press unit 24 that is pressed against the glue surface protective sheet 2b of the film 2 and a lifting cylinder 25 that holds the press unit 24 to be ascendable and descendible, and also, as shown in FIG. 7B, is configured to be capable of moving the press unit 24 in the longitudinal direction of the film application apparatus 1 by a horizontal moving mechanism not shown. The press unit 24 is formed of a disk, which is a substantially hexagon when viewed from the front, and an upper part 24a thereof is formed to be a cone tapering toward the glue surface protective sheet 2b.

Returning to FIG. 2, the first surface sheet removal unit 5 is provided to remove the surface protective sheet 2c (see FIG. 1B) from the surface of the film 2.

As shown in FIGS. 3 and 5, this first surface sheet removal unit 5 is composed of, for example, a feed roller 32 that feeds a removal tape 31 (see FIG. 5) coated with an adhesive on the surface facing the film absorption stage 21, a removal roller 33 that abuts the adhering surface of the removal tape 31 against the film 2 on the film absorption stage 21 and removes the surface protective sheet 2c from the film 2, a take-up roller 34 that winds the removal tape 31, a first roller hold plate 35 that holds the feed roller 32, and a second roller hold plate 36 that holds the removal roller 33 and take-up roller 34 and also is configured to be movable in the vertical direction and the horizontal direction (see FIG. 5).

In the first surface sheet removal unit 5, in synchronization with the horizontal movement (movement in the left direction of FIG. 5) of the second roller hold plate 36 (removal roller 33), the take-up roller 34 rotates in the direction of an arrow A and winds the removal 31 in the direction of an arrow B.

The glue surface sheet removal unit 6 shown in FIG. 2 is provided to remove the glue surface protective sheet 2b (see FIG. 1B) from the back surface of the film 2.

Figure 6:
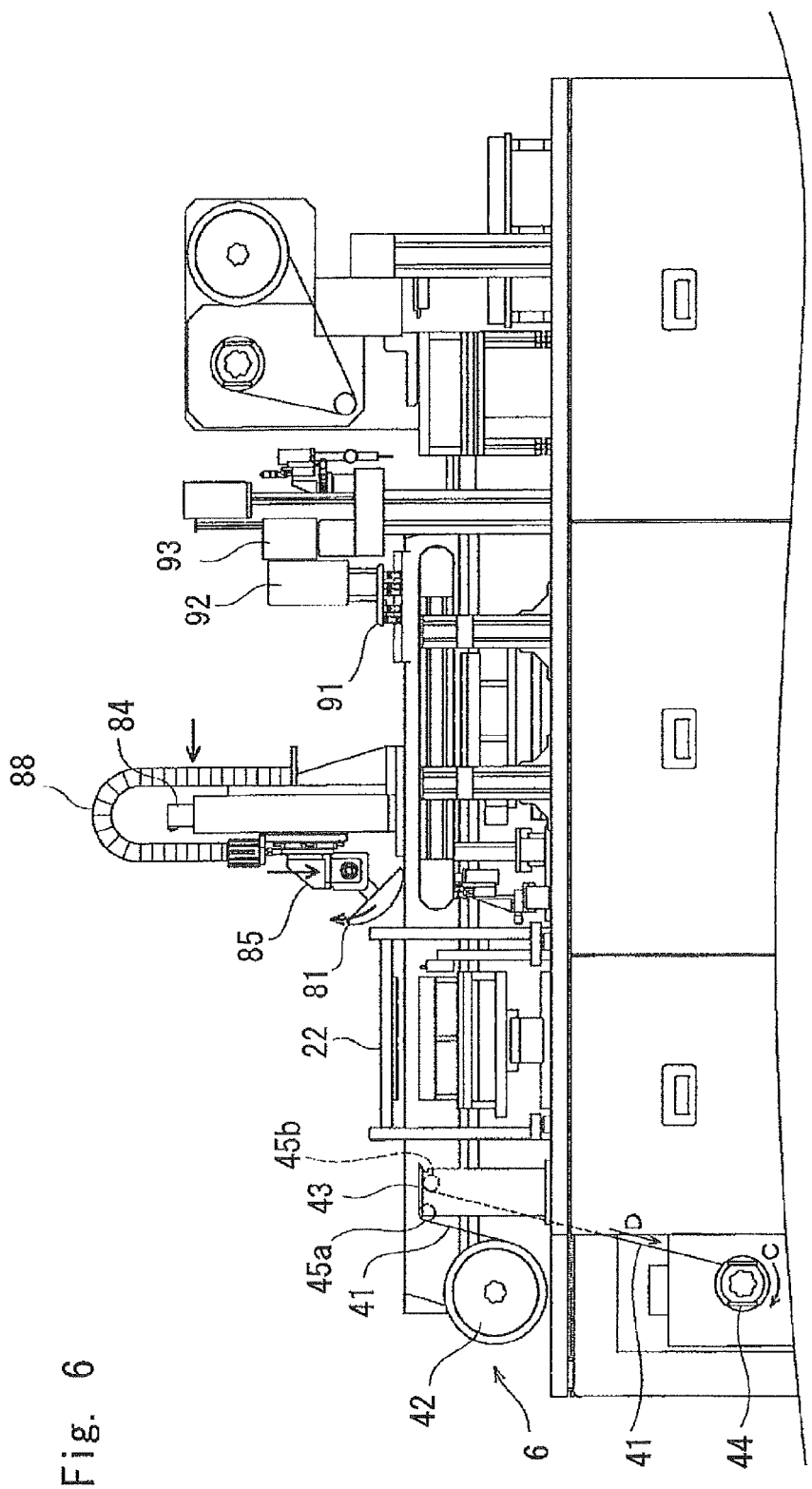
FIG. 6 is a front elevational view that omits illustration of a first surface sheet removal unit of FIG. 5 and shows a state in which an application unit of FIG. 5 is moved.

As shown in FIG. 6, this glue surface sheet removal unit 6 is composed of, for example, a feed roller 42 that feeds the removal tape 41 coated with an adhesive, a tape support plate 43 that has a sharp edge when viewed from the front and supports the removal tape 41, a take-up roller 44 that winds the removal tape 41, and guide rollers 45a and 45b that guide the removal tape 41. In the glue surface sheet removal unit 6, the take-up roller 44 rotates in the direction of an arrow C and winds the removal tape 41 in the direction of an arrow D.

Returning to FIG. 2, the panel supply unit 7 is provided to transport the panel 3 that is loaded by an operator and supply the panel 3 to the second surface sheet removal unit 8 and the application unit 9.

As shown in FIGS. 3 and 5, this panel supply unit 7 is composed of, for example, a panel supply stage 51 that is configured to be movable in the longitudinal direction and the panel 3 being disposed on the top surface thereof, a panel absorption stage 52 that is configured to be movable in the horizontal direction and vacuum-absorb the panel 3 on the top surface thereof, a handler 53 that lifts the panel 3 placed on the panel supply stage 51 and replaces the panel 3 on the panel absorption stage 52, and a camera 55 that detects the position of the panel 3 on the panel absorption stage 52. Note that FIG. 3 illustrates the state in which the panel absorption stage 52 is moved to the left end of the moving region, and FIG. 5 illustrates the state in which the panel absorption stage 52 is moved to the right end thereof.

The second surface sheet removal unit 8 shown in FIG. 2 is provided to remove the surface protective sheet 3b (see FIG. 1D) from the surface of the panel 3.

As shown in FIGS. 3 and 5, this second surface sheet removal unit 8 is composed of, for example, a feed roller 72 that feeds a removal tape 71 (see FIG. 5) coated with an adhesive on the surface facing the panel absorption stage 52, a removal roller 73 that abuts the adhering surface of the removal tape 71 against the film 2 on the film absorption stage 21 and removes the surface protective sheet 3b from the panel 3, a take-up roller 74 that winds the removal tape 71, a first roller hold plate 75 that holds the feed roller 72, and a second roller hold plate 76 that holds the removal roller 73 and take-up roller 74 and also is configured to be movable in the vertical direction and the horizontal direction (see FIG. 5).

In the second surface sheet removal unit 8, in synchronization with the horizontal movement (movement in the right direction of FIG. 5) of the second roller hold plate 76 (removal roller 73), the take-up roller 74 rotates in the direction of an arrow E and winds the removal tape 71 in the direction of an arrow F.

The application unit 9 shown in FIG. 2 is provided to receive the film 2 from the film absorption stage 21 and apply the film 2 to the panel 3 on the panel absorption stage 52.

As shown in FIG. 5, this application unit 9 is composed of, for example, an application head 81 having a curved surface in which a surface facing to the film absorption stage 21 (sheet holding surface) is convex toward the film absorption stage 21, a head support unit 83 that hangs the application head 81 rotatably around a spindle 82, a lifting slider 85 that raises and lowers the application head 81 and the head support unit 83 along a lifting rail 84, a horizontal slider 87 (see FIG. 3) that horizontally moves the whole from the application head 81 to the lifting slider 85 along a horizontal rail 86 in the horizontal direction, and a cableveyor 88 that accommodates various cables. Note that FIG. 6 illustrates the state in which the application unit 9 is horizontally moved and the application head 81 is lowered from the state shown in FIG. 5.

Figure 8:
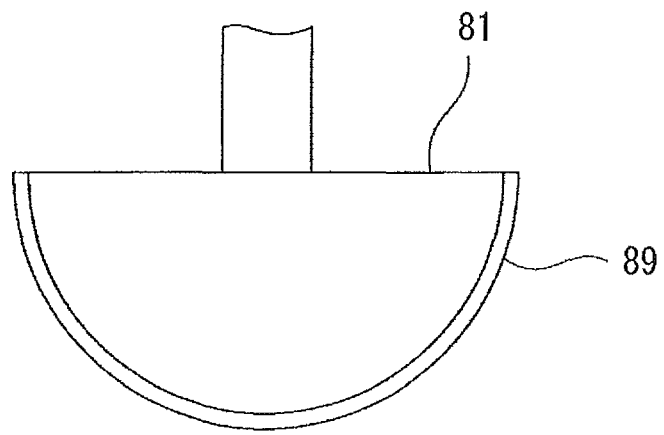
FIG. 8 is an enlarged view showing an application head of FIG. 5.

As shown in FIG. 8, the elastic rubber sheet (hereinafter referred to as "adhesive rubber") 89 having adherence is placed on the sheet holding surface of the application head 81 to enable holding the film 2 while avoiding excessive load on the film 2 and the panel 3.

Returning to FIG. 2, the transport unit 10 is provided to transport the panel 3 with the film 2 being applied thereon to an extraction position EP (see FIG. 3) for an operator to extract the panel 3.

As shown in FIG. 5, this transport unit 10 is composed of, for example, an absorption head 91 that vacuum-absorbs the panel 3 with the film 2 being attached thereon, a lifting cylinder 92 that raises and lowers the absorption head 91, a slider 94 (see FIG. 3) that horizontally moves the absorption head 91 and the lifting cylinder 92 in the longitudinal direction along a guide rail 93, and a belt conveyor 95 that receives the panel 3 with the film 2 being attached thereon from the absorption head 91 and transports the panel 3 to the extraction position EP.

Next, an operation of the film application apparatus 1 including the above configuration is explained with reference mainly to FIGS. 9 to 19C.

Figure 9:
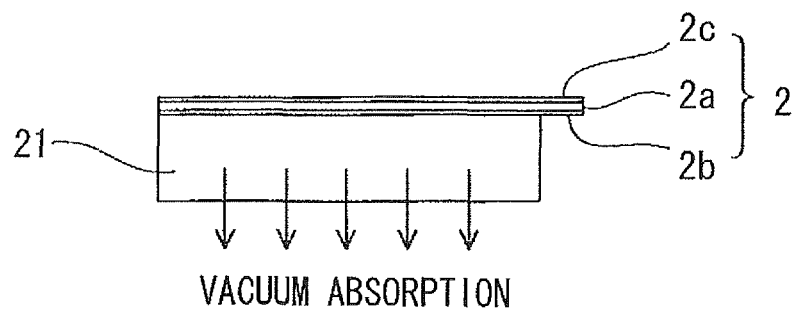
FIG. 9 is a view showing a film absorption process.

At the time of application, firstly the film absorption stage 21 is moved to the front side of the film application apparatus 1 (see FIG. 3), and the film 2 with the surface protective sheet 2c and the glue surface protective sheet 2b being temporarily bonded to front and back is placed on a top surface of the film absorption stage 21. Subsequently, as shown in FIG. 9, a suction pump (not shown) vacuum-absorbs the film 2 and holds the film 2 on the top surface of the film absorption stage 21.

Figure 10A:
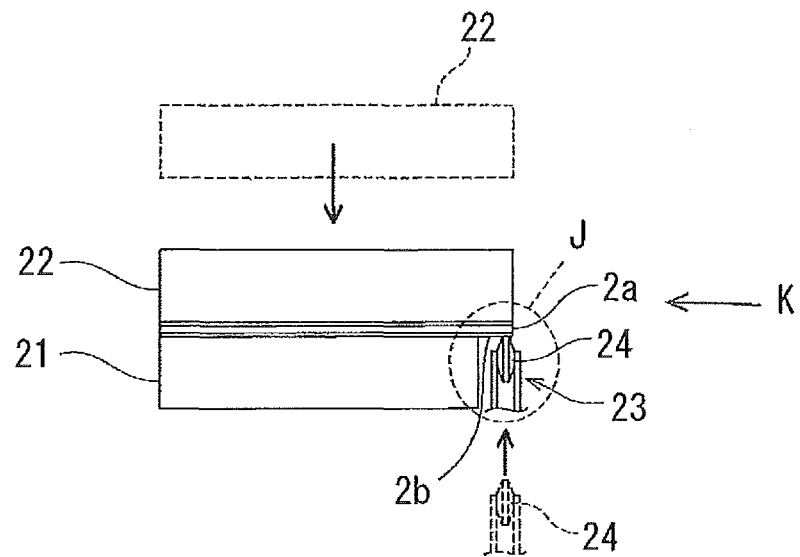
FIG. 10A is a front elevational view of a primary removal process of a glue surface protective sheet.

Next, the film absorption stage 21 is moved to the back of the film application apparatus 1 and positioned below the press stage 22. Then, as shown in FIG. 10A, the press stage 22 is lowered and abutted against the surface of the film 2, and also the press unit 24 of the primary removal apparatus 23 is raised and abutted against the back surface of the film 2. In this way, the film 2 is pressed downward by the press stage 22 and the end part of the glue surface protective sheet 2b is pressed upward by the press unit 24.

Figure 10B:
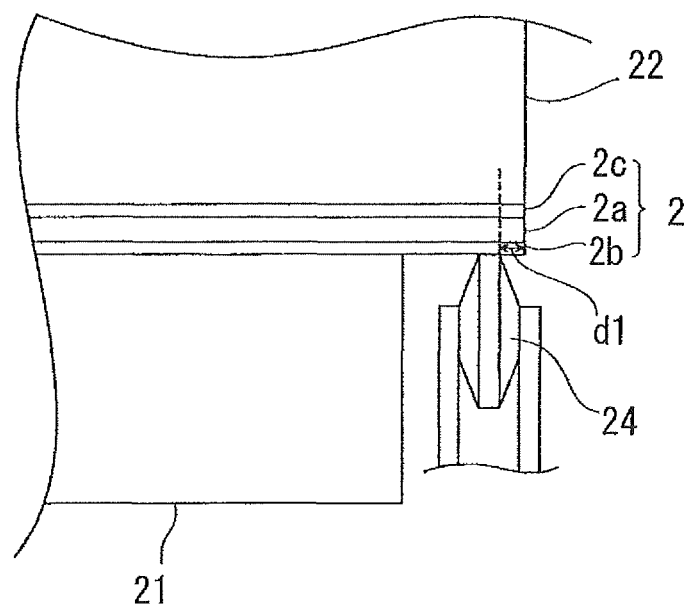
FIG. 10B is an enlarged view of a part J of FIG. 10A.
Figure 10C:
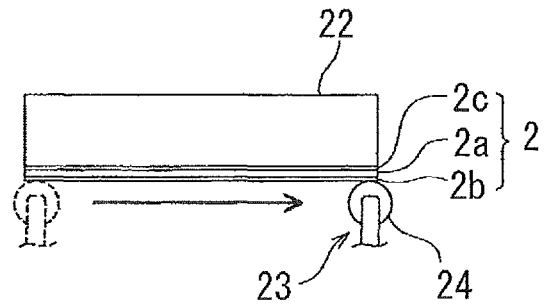
FIG. 10C is a view in the direction of an arrow K of FIG. 10A.
Figure 11:
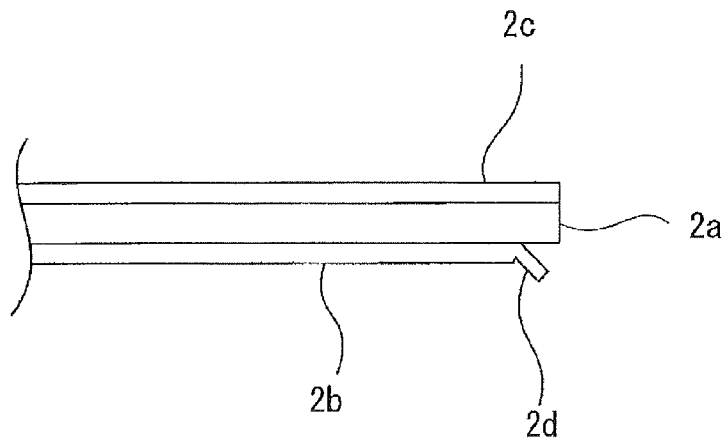
FIG. 11 is a view showing a state of an end part of the glue surface protective sheet after the primary removal.

In the abovementioned case, as shown in FIG. 10B, a tip of the press unit 24 is abutted against the part positioned inside by a predetermined distance d1 from an edge of the glue surface protective sheet 2b, and the part slightly toward the center side from the edge is pressed. After that, as shown in FIG. 10C, the press unit 24 is horizontally moved in the longitudinal direction of the film application apparatus 1 in the state where the glue surface protective sheet 2b is pressed by the press unit 24. Then, as shown in FIG. 11, an end part 2d of the glue surface protective sheet 2b is bent and raised and the end part 2d is removed from the back surface of the film body 2a (primary removal).

Figure 12A:
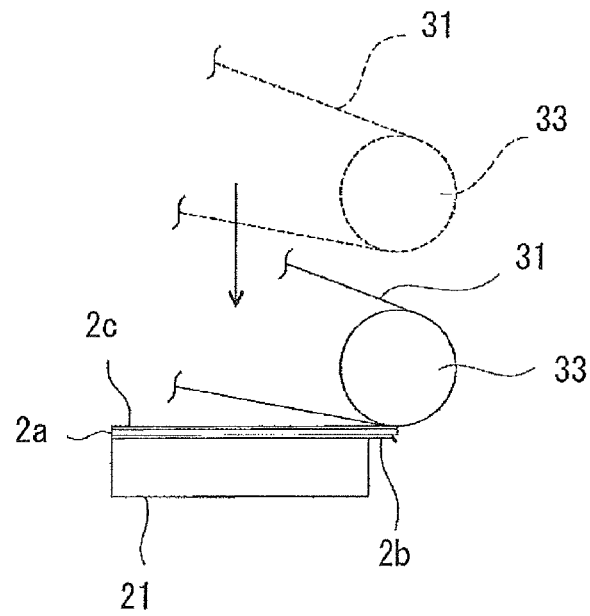
FIG. 12A is a view showing a removal process (when a removal roller is lowered) of a surface protective sheet.
Figure 12B:
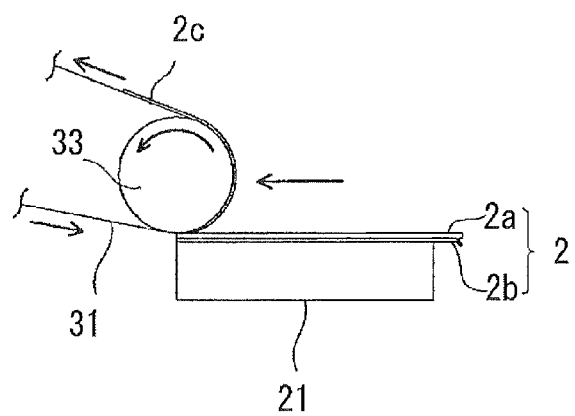
FIG. 12B is a view showing the removal process (when the removal roller is lowered) of the surface protective sheet.

Subsequently, while the press stage 22 is raised and spaced from the film 2, the film absorption stage 21 is horizontally moved to the front side of the film application apparatus 1 and positioned below the removal roller 33 of the first surface sheet removal unit 5. In this state, as shown in FIG. 12A, the removal roller 33 (second roller hold plate 36) is lowered, and the removal tape 31 is abutted against the right end of the surface protective sheet 2c that is temporarily bonded to the surface of the film 2. After that, as shown in FIG. 12B, the removal roller 33 is moved in the left direction during rotation, and the surface protective sheet 2c is bonded to the adhering surface of the removal tape 31 and removed from the surface of the film body 2a.

Next, while horizontally moving the film absorption stage 21 to the back side of the film application apparatus 1, the press stage 22 and the primary removal apparatus 23 are horizontally moved to the front side of the film application apparatus 1 (see FIG. 4). In this state, the application head 81 (the whole from the application head 81 to the lifting slider 85) is moved in the left direction, and the film 2 with the surface protective sheet 2c being removed is disposed to face the application head 81.

Figure 13A:
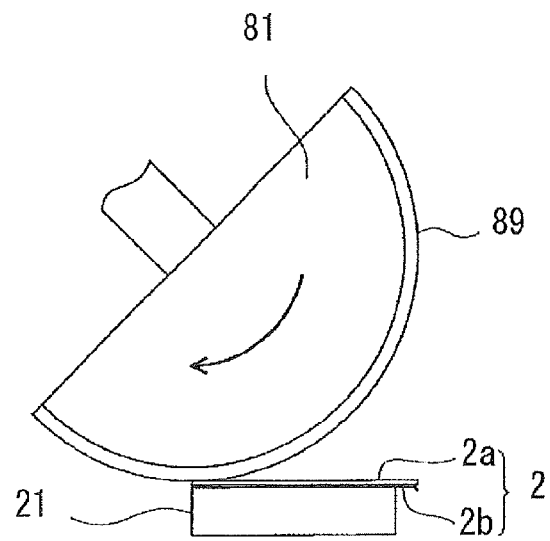
FIG. 13A is a view showing an adhering and holding process of a film (when a film abuts)
Figure 13B:
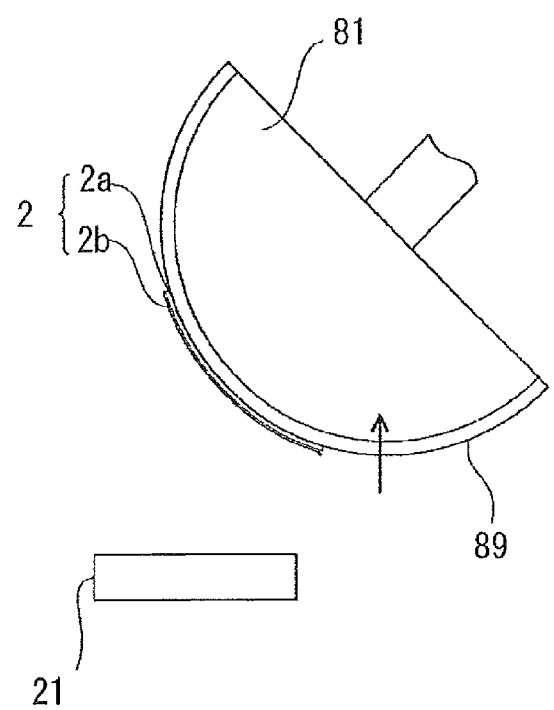
FIG. 13B is a view showing the adhering and holding process of the film (when the film adheres)

Subsequently, as shown in FIG. 13A, while lowering the application head 81 to abut against the surface of the film body 2a, the absorption of the film absorption stage 21 is removed. After that, as shown in FIG. 13B, the application head 81 is rotated clockwise while horizontally moving the application unit 9 in the right direction, and the film 2 is bonded to the adhesive rubber 89.

Figure 14A:
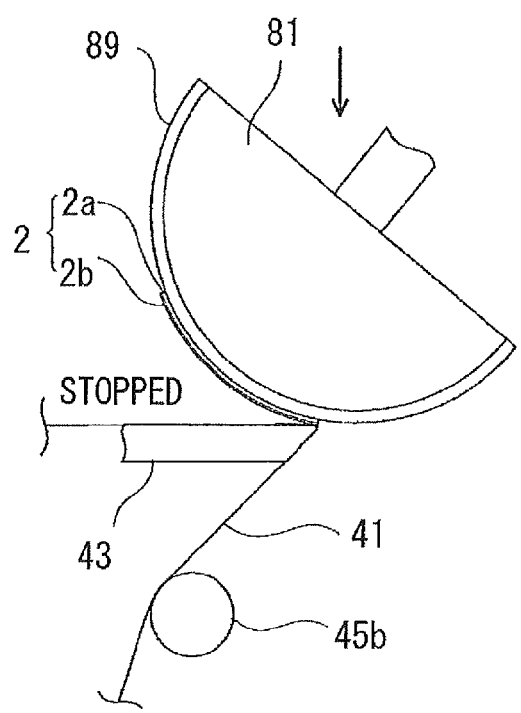
FIG. 14A is a view showing a secondary removal process of the glue surface protective sheet (when an application head abuts)

After raising the application head 81 that holds the film 2, the application head 81 is horizontally moved in the left direction, and the film 2 is positioned above the tape support plate 43 of the glue surface sheet removal unit 6 (see FIG. 6). Subsequently, as shown in FIG. 14A, in the state where the take-up roller 44 of the glue surface sheet removal unit 6 (see FIG. 6) is stopped, the application head 81 is lowered and the right end part of the glue surface protective sheet 2b (end part on the side of the primary removal) is abutted against the adhering surface of the removal tape 41.

Figure 14B:
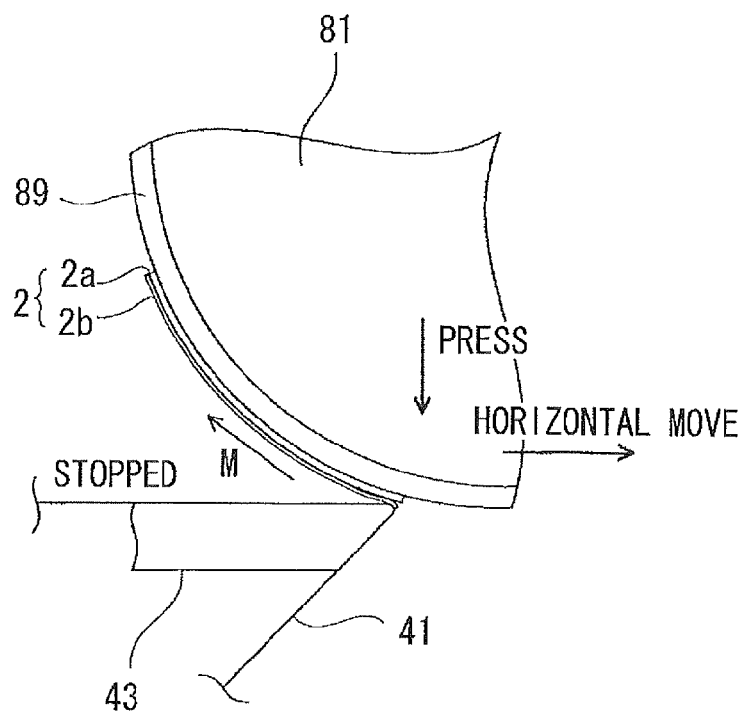
FIG. 14B is a view showing the secondary removal process of the glue surface protective sheet (when the application head horizontally moves)

Next, as shown in FIG. 14B, while pressing the application head 81 by predetermined pressing force toward the tape support plate 43, the application head 81 is horizontally moved in the right direction. At this time, the take-up roller 44 is maintained in the stopped state so as not to cause the removal tape 41 to move. Accordingly, the right end part of the glue surface protective sheet 2b is loosened by the effect of stress in the direction of an arrow M (direction toward the opposite end part to the side of the primary removal), for example, to give the glue surface protective sheet 2b removal tendency (secondary removal).

Figure 14C:
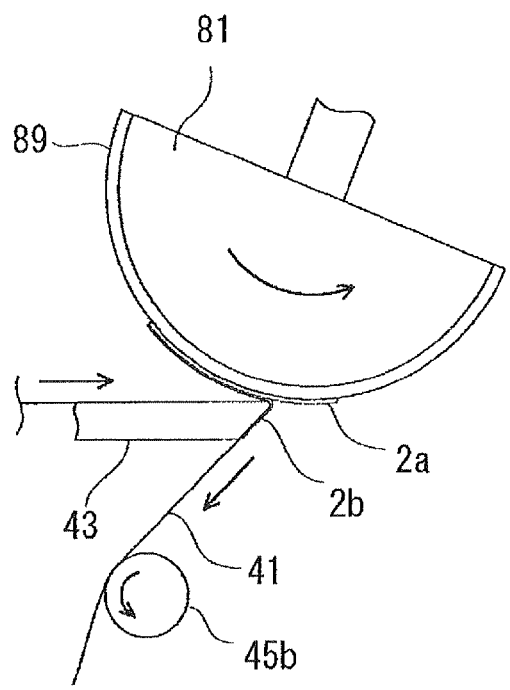
FIG. 14C is a view showing the secondary removal process of the glue surface protective sheet (when the application head rotates)
Figure 14D:
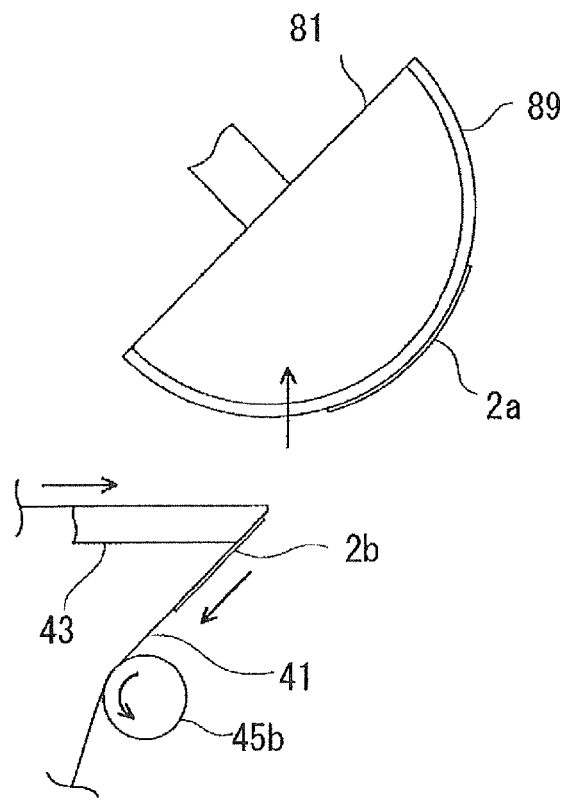
FIG. 14D is a view showing the secondary removal process of the glue surface protective sheet (when the application head is spaced)

Next, as shown in FIG. 14C, while rotating the take-up roller 44 and moving the removal tape 41, the application head 81 is rotated counter-clockwise along with the movement thereof. Thus, the glue surface protective sheet 2b is bonded to the removal tape 41 in order from the right end part and removed from the back surface of the film body 2a (third removal). Then, as shown in FIG. 14D, at the stage when the entire glue surface protective sheet 2b is removed, the application head 81 is raised and spaced from the removal tape 41.

Figure 15:
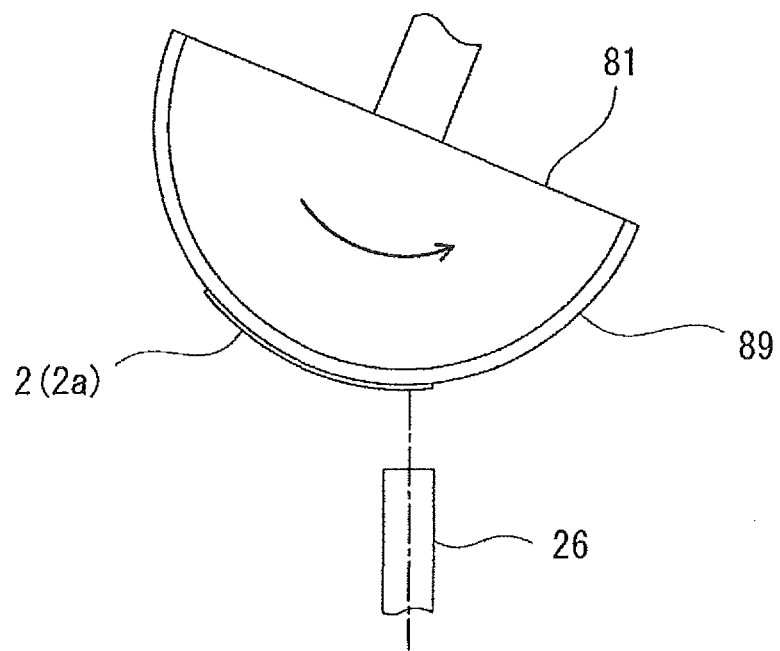
FIG. 15 is a view showing a position detection process of the glue surface protective sheet.

Subsequently, as shown in FIG. 15, the application head 81 is horizontally moved in the right direction and passed above the camera 26. At this time, the camera 26 captures an alignment mark (not shown) added to the film 2 on the application head 81 and detects the position of the film 2.

Figure 16:
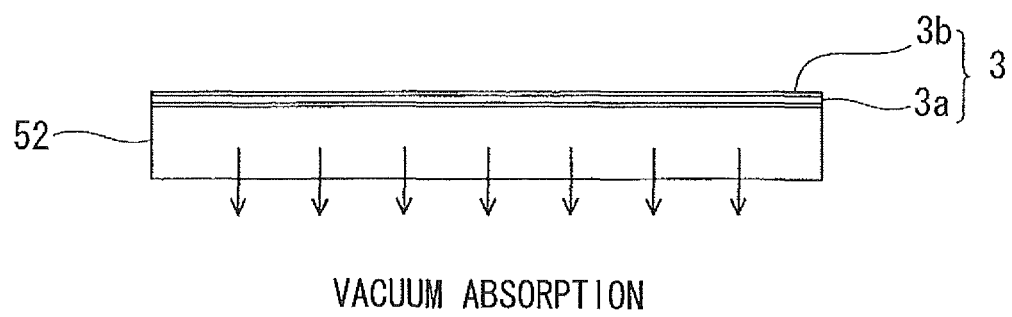
FIG. 16 is a view showing a panel absorption process.
Figure 17A:
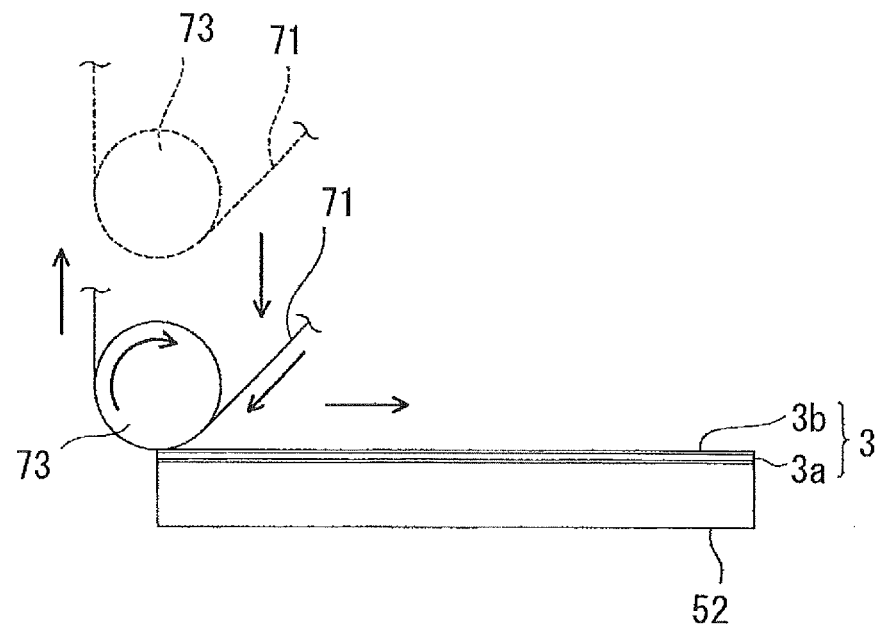
FIG. 17A is a view showing a removal process of the surface protective sheet (when the removal roller abuts)
Figure 17B:
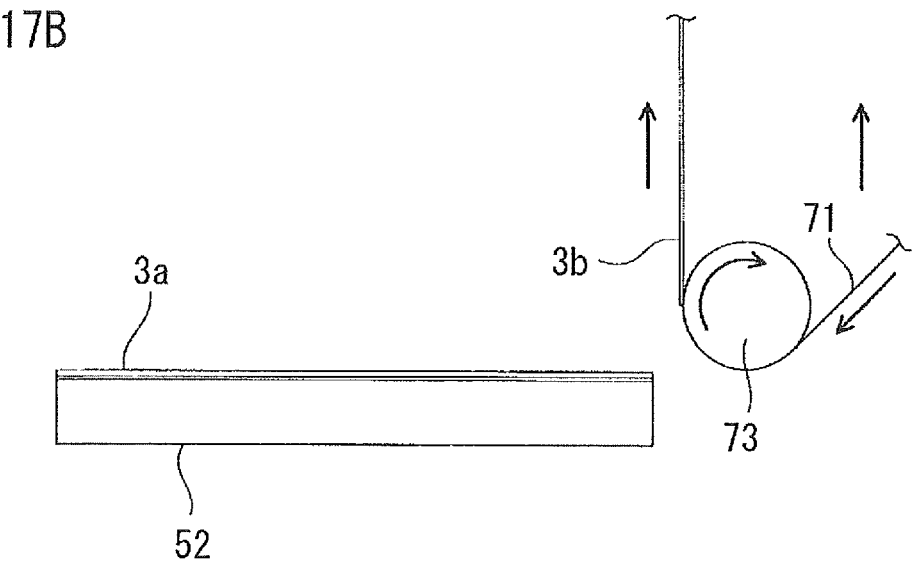
FIG. 17B is a view showing the removal process of the surface protective sheet (when the surface protective sheet is removed)
Figure 18:
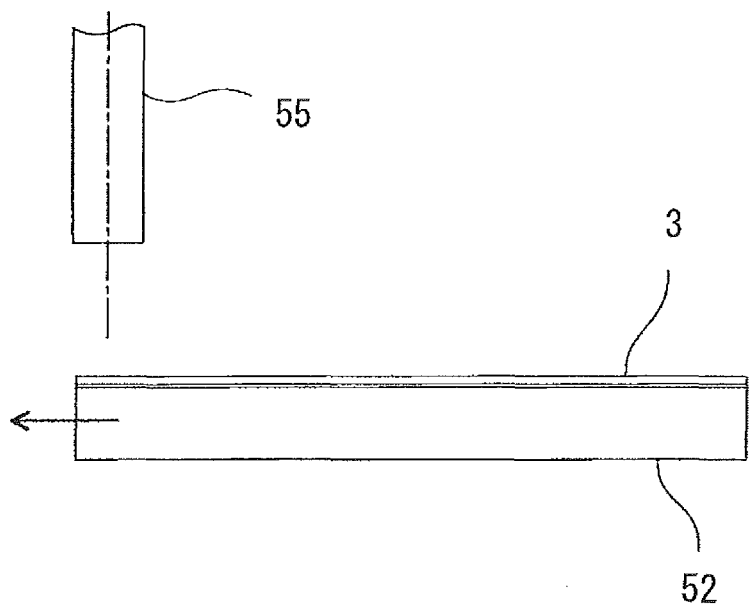
FIG. 18 is a view showing a position detection process of the panel.

In parallel with the processes of above FIGS. 9 to 15, the panel 3 is placed on the panel supply stage 51 (see FIG. 3), and as shown in FIG. 16, replaced on the panel absorption stage 52 to be vacuum-absorbed. Subsequently, as shown in FIGS. 17A and 17B, the surface protective sheet 3b temporarily bonded to the surface of the panel 3 is removed using the second surface sheet removal unit 8 (see FIGS. 3 and 5). Next, as shown in FIG. 18, the panel absorption stage 52 is horizontally moved in the left direction and passed below the camera 55, an alignment mark (not shown) added to the panel 3 is captured to detect the position of the panel 3.

Figure 19A:
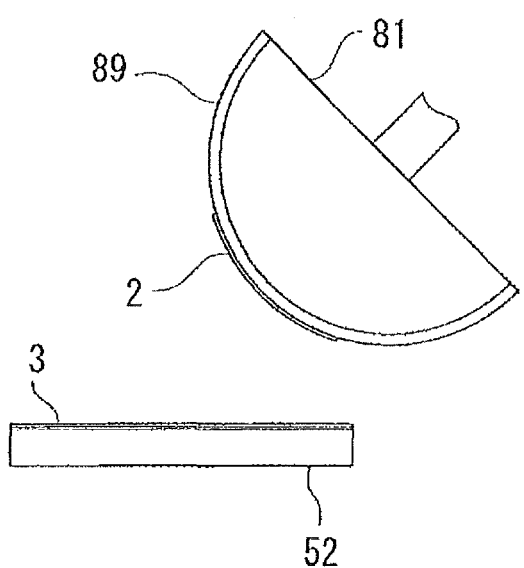
FIG. 19A is a diagram showing a film application process to the panel (when a panel absorption stage moves)
Figure 19B:
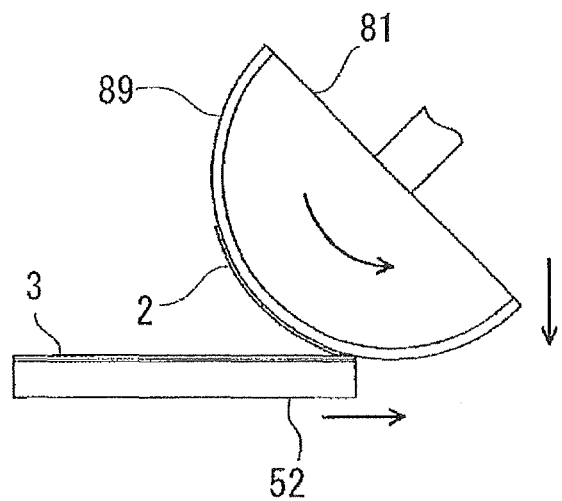
FIG. 19B is a view showing the film application process to the panel (when the application head is lowered)
Figure 19C:
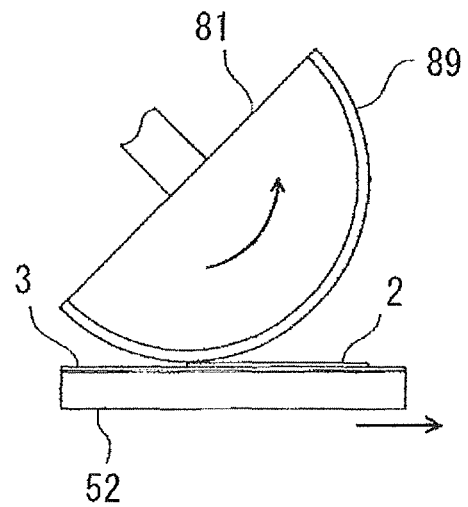
FIG. 19C is a view showing the film application process to the panel (when the application head rotates)

At the stage when preparation of both of the film 2 and the panel 3 is completed, as shown in FIG. 19A, the panel absorption stage 52 is horizontally moved in the left direction, and the panel 3 is positioned lower left of the application head 81. After that, as shown in FIG. 19B, the application head 81 is lowered and the film 2 is abutted against the panel 3. Then, as shown in FIG. 19C, while horizontally moving the panel absorption stage 52 in the right direction, the application head 81 is rotated counter-clockwise, and the film 2 is applied to the surface of the panel 3.

Subsequently, the adsorption of the panel absorption stage 52 is removed, and the panel 3 with the film 2 being attached thereon is absorbed by the application head 91 (see FIG. 5) of the transport unit 10 to be extracted. Lastly, the panel 3 is transported to the belt conveyor 95 side (see FIG. 3) side and moved to the extraction point EP.

Figure 28A:
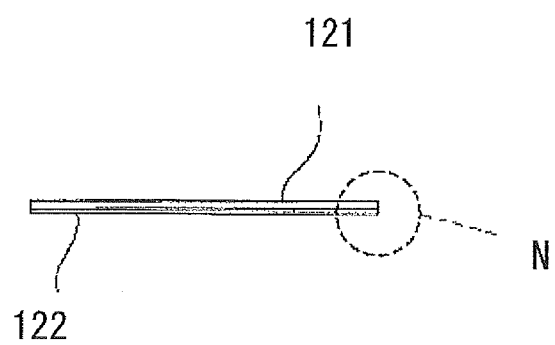
FIG. 28A is a view showing a separation type film.
Figure 28B:
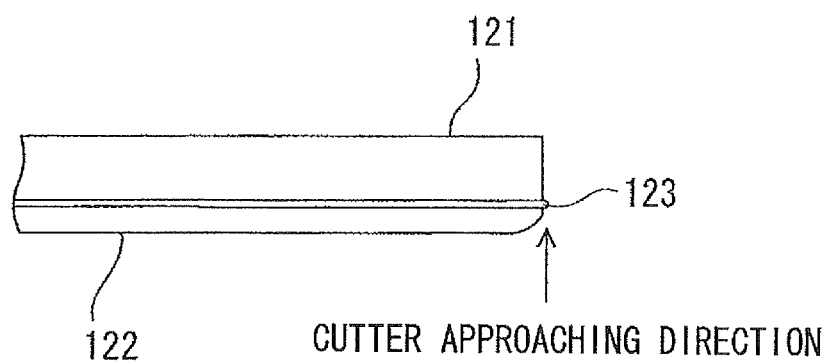
FIG. 28B is an enlarged diagram of a part N of FIG. 28A.

As mentioned above, according to the present invention, the end part 2d of the glue surface protective sheet 2b is bent and raised by the press unit 24 to be primarily removed prior to the entire removal of the glue surface protective sheet 2b, thus the glue surface protective sheet 2b can be removed starting from the removed part (end part 2d) in the primary removal at the time of entire removal. Accordingly, when the glue surface protective sheet 2b with the same size as the film 2 is temporarily bonded (see FIG. 28A) and when the end part of the glue surface protective sheet 2b is deformed (see FIG. 28B), for example, the glue surface protective sheet 2b can be readily removed, and the glue surface protective sheet can therefore be readily removed in the case of the separation type film.

Moreover, according to this embodiment, after the primary removal, the end part of the primarily removed side on the glue surface protective sheet 2b is pressed toward the opposite end part to be secondarily removed, and thereby giving the removal tendency to the glue surface protective sheet 2b prior to the entire removal and further facilitating the removal of the glue surface protective sheet 2b.

By the way, in the case of continuously applying multiple films 2, scratches and plastic deformation (recess) of the adhesive rubber 89 increase with the increase in the number of application, thus the adhesive rubber 89 must be periodically replaced. However, the thickness of the adhesive rubber 89 changes in the replacement, thus there may be variation in the pressing force of the films 2 in the secondary removal process of FIGS. 14A to 14D and the application process of FIG. 19A to 19C, for example.

Figure 20:
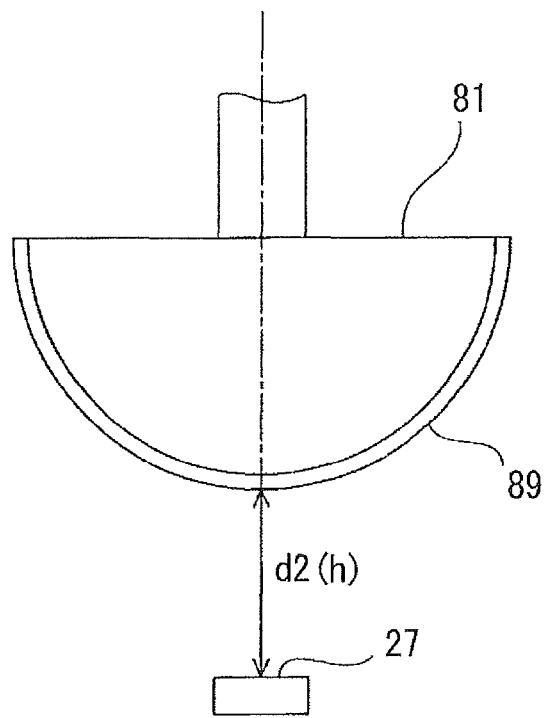
FIG. 20 is a view showing a height detection process of the application head.

Then, as shown in FIG. 20, a distance d2 from the height sensor 27 (reference position) to the surface of the adhesive rubber 89 is detected, and the application head 81 is lowered or raised so that the distances to be detected will be a constant value (to have the same value before and after the replacement). In this way, height h, which is a reference position of the application head 81, is finely tuned, and the pressing force of the films 2 in the secondary removal process and the like is conformed.

It is desirable to perform the above height adjustment of the application head 81 periodically or at the time of replacing adhesive rubber 89. Moreover, it is preferable to use the non-contact detection method for the detection method of the distance d2 to avoid dust and scratch on the adhering surface of the adhesive rubber 89. Specifically, laser detection, ultrasonic detection and the like can be used.

Although the exemplary embodiment of the present invention has been explained so far, the present invention is not limited by the above configurations but various modifications can be made within the scope of the invention described in the claims.

For example, although an example is explained in this exemplary embodiment in which the film application apparatus according to the present invention is incorporated to the application of the film to the liquid crystal display panel, an object to apply the film is not especially limited. For example, the present invention can be incorporated to the case of applying the film to a plasma display panel and the case of applying the film to an object other than the panel.

Moreover, although in this exemplary embodiment, at the time of the primary removal of the glue surface protective sheet 2b, the press unit 24 is raised from below the film 2 while pressing the film 2 from above by the press stage 22 as shown in FIGS. 10A to 10C, the film 2 may be turned upside down and while supporting the film 2, the press unit 24 may be lowered from above the film 2.

Further, in the above exemplary embodiment, as shown in FIGS. 7A and 7B, the primary removal is performed using the discoid press unit 24, however the shape of the press unit 24 may be other shapes such as a rectangular plate shape.

Furthermore, in the above exemplary embodiment, at the time of the secondary removal of the glue surface protective sheet 2b, as shown in FIG. 14B, while the movement of the removal tape 41 is stopped, the application head 81 is horizontally moved in the right direction with the lowered application head 81.

Figure 21:
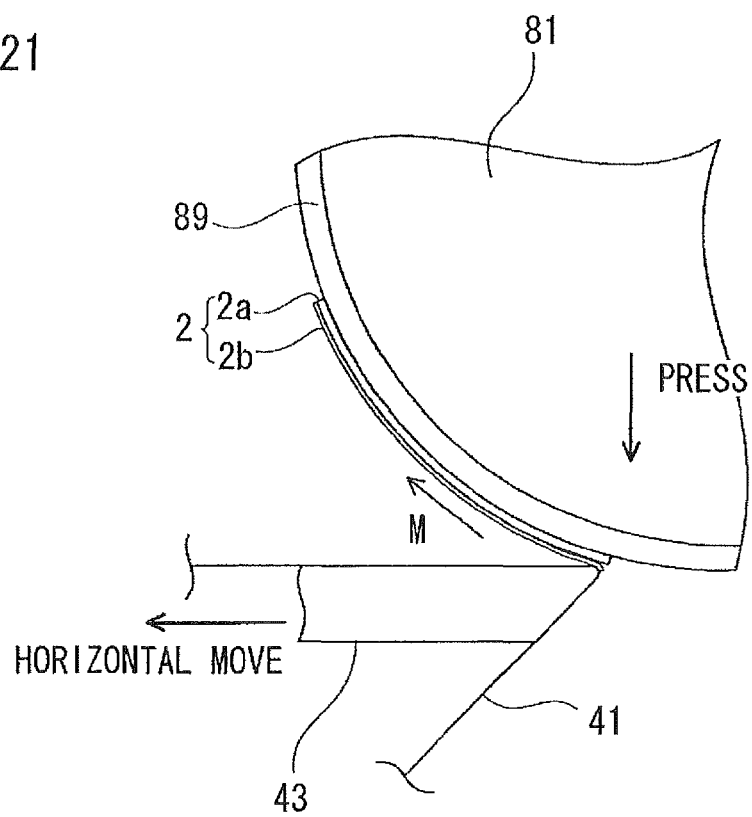
FIG. 21 is a view showing another example of the secondary removal process of the glue surface protective sheet.
Figure 22:
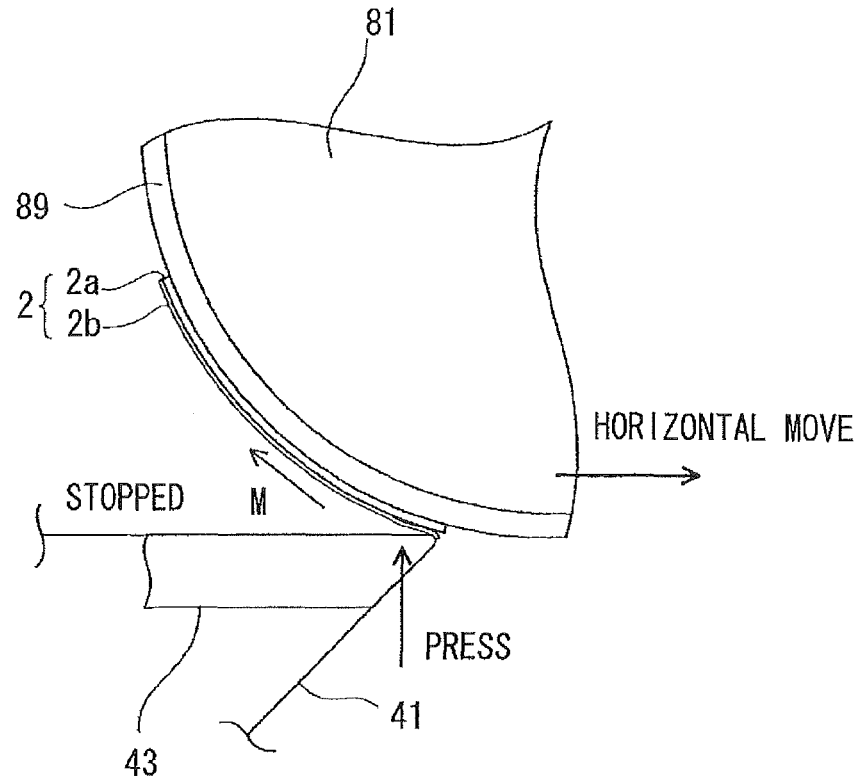
FIG. 22 is a view showing another example of the secondary removal process of the glue surface protective sheet.
Figure 23:
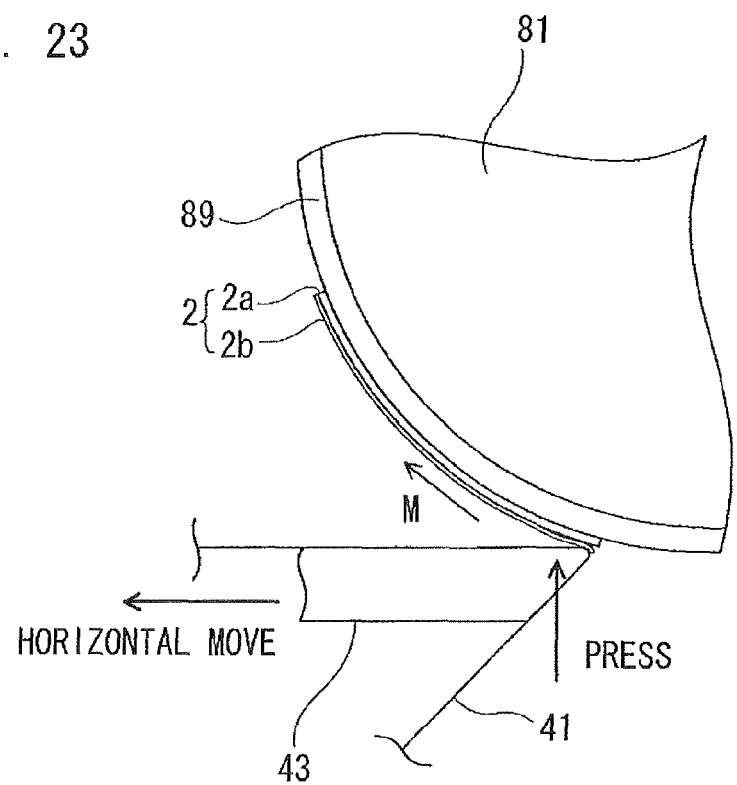
FIG. 23 is a view showing another example of the secondary removal process of the glue surface protective sheet.

However in the secondary removal, only the right end part of the glue surface protective sheet 2b has to be pressed in the direction of an arrow M, thus as shown in FIG. 21, while the horizontal position and the rotation position of the application head 81 is fixed, the application head 81 is lowered and in that state, the removal tape 41 may be moved in the left direction. Additionally, as shown in FIG. 22, while the movement of the removal tape 41 is stopped, the application head 81 may be horizontally moved in the right direction with the raised tape support plate 43. Alternatively, as shown in FIG. 23, while the horizontal position and the rotation position of the application head 81 is fixed, the removal tape 41 may be moved in the left direction with the raised tape support plate 43.

Figure 24:
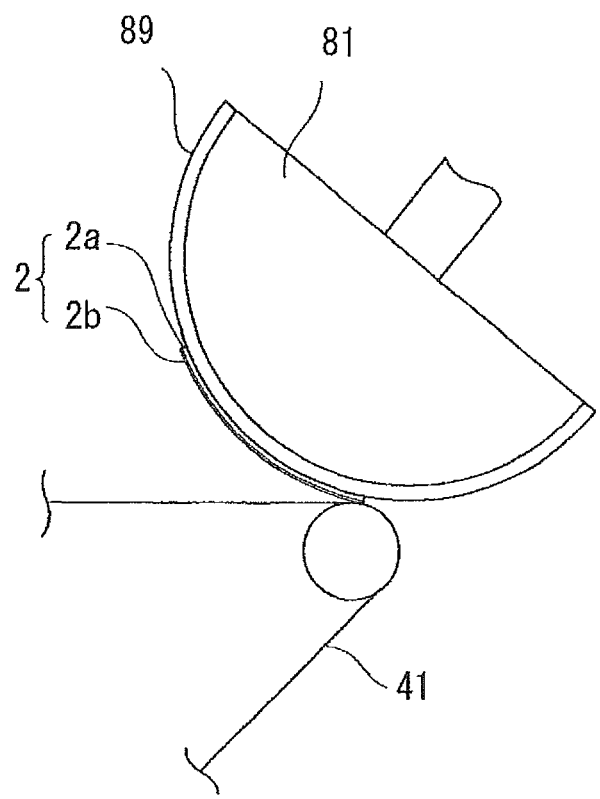
FIG. 24 is a view showing another example of a tape support.

Moreover, in this exemplary embodiment, as shown in FIGS. 14A to 14D, the tape support plate 43 is used as a support unit to support the removal tape 41, however as shown in FIG. 24, the tape support unit may be composed of a guide roller for guiding the removal tape 41.

Figure 25:
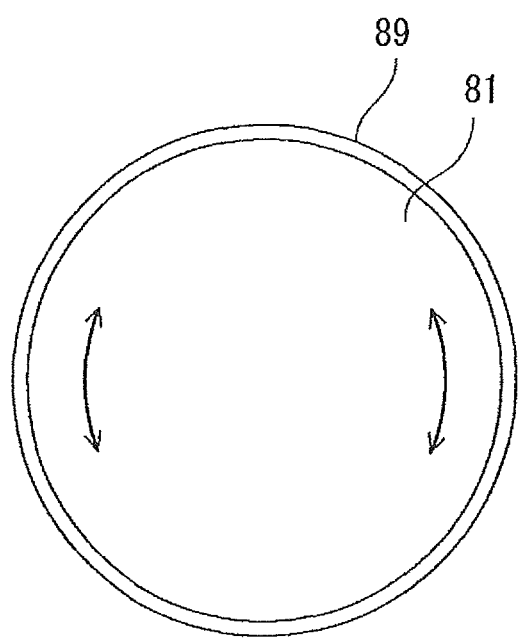
FIG. 25 is a view showing another example of the application head.
Figure 26A:
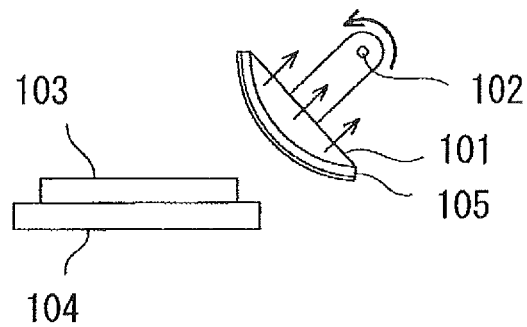
FIG. 26A is a view showing an example of a film application apparatus (when a film is absorbed) according to a related art.
Figure 26B:
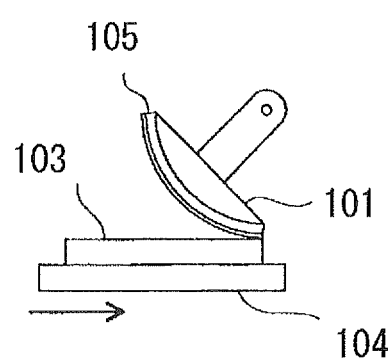
FIG. 26B is a view showing the example of the film application apparatus according to the related art (when a panel support moves)
Figure 26C:
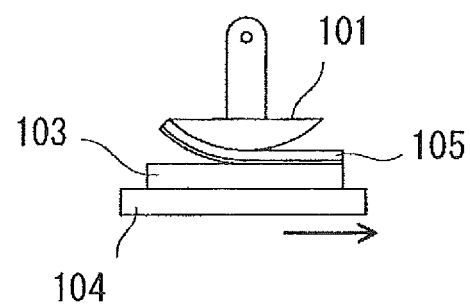
FIG. 26C is a view showing the example of the film application apparatus according to the related art (when an application head rotates)
Figure 26D:
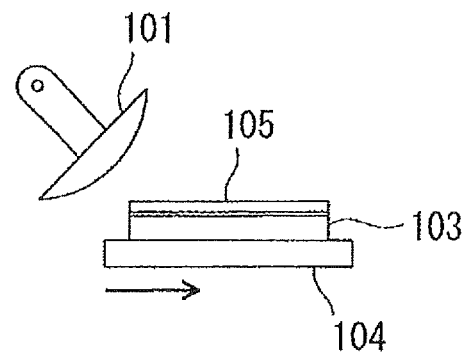
FIG. 26D is a view showing the example of the film application apparatus according to the related art (when the film is applied)
Figure 27:
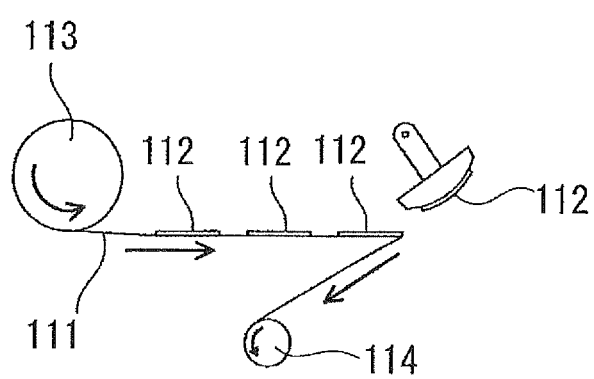
FIG. 27 is a view showing an example of an apparatus for removing a film from a long strip-shaped glue surface protective sheet.

In addition, in this exemplary embodiment, as shown in FIG. 8, the application head 81 that is substantially semicircular when viewed from the front is used, however as shown in FIG. 25, the application head that is circular when viewed from the front (cylindrical roller type application head) 81 may also be used.

Further, in the above exemplary embodiment, the adhesive rubber 89 is placed on the holding surface of the application head 81 and the film 2 is supposed by adhesion, however an absorption hole may be drilled in the holding surface of the application head 81 and the film 2 may be held by absorption.

The present application claims priority rights of and is based on Japanese Patent Application No. 2010-143415 filed on Jun. 24, 2010 in the Japanese Patent Office, the entire contents of which are hereby incorporated by reference.

REFERENCE SIGNS LIST

1 FILM APPLICATION APPARATUS
2 FILM
2a FILM BODY
2b ADHESIVE SURFACE PROTECTIVE SHEET
2c SURFACE PROTECTIVE SHEET
3 PANEL
3a PANEL BODY
3b SURFACE PROTECTIVE SHEET
4 FILM SUPPLY UNIT
5 FIRST SURFACE SHEET REMOVAL UNIT
6 PAST SURFACE SHEET REMOVAL UNIT
7 PANEL SUPPLY UNIT
8 SECOND SURFACE SHEET REMOVAL UNIT
9 APPLICATION UNIT
10 TRANSPORT UNIT
21 FILM ABSORPTION STAGE
22 PRESS STAGE
23 PRIMARY REMOVAL APPARATUS
24 PRESS UNIT
24a UPPER PART
25 LIFTING CYLINDER
26 CAMERA
27 HEIGHT SENSOR
28 GUIDE RAIL
29 GUIDE RAIL
31 REMOVAL TAPE
32 FEED ROLLER
33 REMOVAL ROLLER
34 TAKE-UP ROLLER
35 FIRST ROLLER HOLD PLATE
36 SECOND ROLLER HOLD PLATE
41 REMOVAL TAPE
42 FEED ROLLER
43 TAPE SUPPORT PLATE
44 TAKE-UP ROLLER
45 (45a, 45b) GUIDE ROLLER
51 PANEL SUPPLY STAGE
52 PANEL ABSORPTION STAGE
53 HANDLER
55 CAMERA
71 REMOVAL TAPE
72 FEED ROLLER
73 REMOVAL ROLLER
74 TAKE-UP ROLLER
75 FIRST ROLLER HOLD PLATE
76 SECOND ROLLER HOLD PLATE
81 APPLICATION HEAD
82 SPINDLE
83 HEAD SUPPORT UNIT
84 LIFTING RAIL
85 LIFTING SLIDER
86 HORIZONTAL RAIL
87 HORIZONTAL SLIDER
88 CABLEVEYOR
89 ADHESIVE RUBBER
91 ABSORPTION HEAD
92 LIFTING CYLINDER
93 GUIDE RAIL
94 SLIDER

The invention claimed is:

1. A film application apparatus comprising:
a film press unit that presses a separated film from an opposite surface side to a surface with a glue surface protective sheet of the film temporarily bonded thereto in a state where the glue surface protective sheet is temporarily bonded to an adhering surface;
a press unit that presses an end part of the glue surface protective sheet from the surface with the glue surface protective sheet of the film being temporarily bonded thereto so as to bend and raise the end part of the glue surface protective sheet and remove the end part of the glue surface protective sheet from the film and therefore primary removal of the glue surface protective sheet is performed;
an application head that holds the film with the glue surface protective sheet being primarily removed;
a removal unit that removes the entire glue surface protective sheet from the film held by the application head,
wherein the film application apparatus removes the glue surface protective sheet from the film and applies the film to an object to be applied; and
wherein the press unit moves in a direction parallel to the glue surface protective sheet in a state where the end part of the glue surface protective sheet is pressed in a direction vertical to the glue surface protective sheet.

2. The film application apparatus according to claim 1, wherein the end part of the glue surface protective sheet on the bent and raised side is pressed toward an opposite end part to the end part, and secondary removal is performed to the glue surface protective sheet.

3. The film application apparatus according to claim 2, wherein
the removal unit comprises:
a removal tape including an adhering surface on a surface facing the glue surface protective sheet;

a tape support unit that supports the removal tape; and
a movement mechanism that moves the removal tape, and while stopping the movement of the removal tape, the film application apparatus presses the end part of the glue surface protective side on the bent and raised side or one side of the removal tape supported by the tape support unit against the end part of the glue surface protective sheet or the other side of the supported removal tape, and in that state, moves the application head so that the end part of the glue surface protective sheet on the bent and raised side is pressed toward the opposite end part to the end part.

4. The film application apparatus according to claim 2, wherein the removal unit comprises:
a removal tape including an adhering surface on a surface facing the glue surface protective sheet;
a tape support unit that supports the removal tape; and
a movement mechanism that moves the removal tape, and while stopping movement of the application head, the film application apparatus presses the end part of the glue surface protective side on the bent and raised side or one side of the removal tape supported by the tape support unit against the end part of the glue surface protective sheet or the other side of the supported removal tape, and in that state, moves the removal tape so that the end part of the glue surface protective sheet on the bent and raised side is pressed toward the opposite end part to the end part.

5. The film application apparatus according to claim 1, wherein the application head is configured to be rotatable around a spindle and also has a curved surface that is convex toward the glue surface protective sheet and holds the film with the glue surface protective sheet being primarily removed on the curved surface.

6. The film application apparatus according to claim 5, wherein adhesive rubber that adheres to and holds the glue surface protective sheet is placed on the curved surface of the application head.

7. The film application apparatus according to claim 6, further comprising:
a detection apparatus that detects a distance from a predetermined reference position to a surface of the adhesive rubber; and
a height adjustment apparatus that adjusts height of the application head so that the distance detected by the detection apparatus will be a constant value.

8. The film application apparatus according to claim 1, wherein the end part of the glue surface protective sheet on the bent and raised side is pressed toward an opposite end part to the end part, and secondary removal is performed to the glue surface protective sheet.

9. The film application apparatus according to claim 1, wherein the application head is configured to be rotatable around a spindle and also has a curved surface that is convex toward the glue surface protective sheet and holds the film with the glue surface protective sheet being primarily removed on the curved surface.

10. The film application apparatus according to claim 2, wherein the application head is configured to be rotatable around a spindle and also has a curved surface that is convex toward the glue surface protective sheet and holds the film with the glue surface protective sheet being primarily removed on the curved surface.

11. The film application apparatus according to claim 3, wherein the application head is configured to be rotatable around a spindle and also has a curved surface that is convex toward the glue surface protective sheet and holds the film with the glue surface protective sheet being primarily removed on the curved surface.

12. The film application apparatus according to claim 4, wherein the application head is configured to be rotatable around a spindle and also has a curved surface that is convex toward the glue surface protective sheet and holds the film with the glue surface protective sheet being primarily removed on the curved surface.

* * * * *